United States Patent [19]

Onoda et al.

[11] Patent Number: 5,040,349
[45] Date of Patent: Aug. 20, 1991

[54] COLLAPSIBLE TRUSS STRUCTURES

[75] Inventors: Junjiro Onoda, 1986-10, Kanai-Machi, Machida-Shi, Tokyo-To; Kiyoshi Takamatsu, Tokyo, both of Japan

[73] Assignees: Fuji Jukogyo Kabushiki Kaisha; Junjiro Onoda, both of Tokyo, Japan

[21] Appl. No.: 499,892

[22] Filed: Mar. 27, 1990

[30] Foreign Application Priority Data

Mar. 31, 1989 [JP] Japan .................................. 1-81138

[51] Int. Cl.$^5$ ............................................ E04H 12/18
[52] U.S. Cl. ........................................ 52/646; 52/645; 52/648
[58] Field of Search .......... 52/645, 648, 646, DIG. 10

[56] References Cited

U.S. PATENT DOCUMENTS

| 3,766,932 | 10/1973 | Sidis et al. | 52/646 |
| 3,783,573 | 1/1974 | Vaughan | 52/646 |
| 4,017,932 | 4/1977 | Lotto et al. | 52/646 |
| 4,276,726 | 7/1981 | Derus | 52/646 |
| 4,745,725 | 5/1988 | Onoda | 52/646 |
| 4,771,585 | 9/1988 | Onoda et al. | 52/646 |
| 4,819,399 | 4/1989 | Onoda | 52/646 |

OTHER PUBLICATIONS

NASA Contractor Report 3698, Entitled "Technology Needs of Advanced Earth Observation Spacecraft", (1984).

Primary Examiner—David A. Scherbel
Assistant Examiner—Linda J. Watson
Attorney, Agent, or Firm—Beveridge, DeGrandi & Weilacher

[57] ABSTRACT

A collapsible truss structure in a basic form comprises eight joint connectors, twelve skeletal bars pivotally connected at their ends by the joint connectors, a diagonal bar or bars, and a slide hinge, and in its expanded or deployed state is in the shape of a rectangular parallelepiped formed by the twelve bars, the diagonal bar or bars being pivotally connected at its one end to one joint connector and extending diagonally within the deployed structure toward the most remote joint connector or connectors, near which the other end or ends of the diagonal bar or bars are pivotally connected to the slide hinge slidably fitted around one of the bars. The structure is collapsed by sliding the slide hinge away from said most remote joint connector. Lenghts of flexible bracing material can be stretched diagonally across bars of the structure to stably preserve the deployed state.

5 Claims, 7 Drawing Sheets

5,040,349

COLLAPSIBLE TRUSS STRUCTURES

BACKGROUND OF THE INVENTION

The present invention relates to collapsible truss structures usable for a wide variety of applications. An important application is that to medium to large structures to be placed in outer space. Principal examples of such structures are large antenna structures, solar power-generation satellites, space colonies, space factories, and space bases or stations. The collapsible structures according to the present invention can also be used on earth. One example of such structures is a temporary structure of portable type for emergency use.

In general, a space structure is transported into outer space as a payload of a rocket-propelled spacecraft such as a space shuttle. A payload is restricted in bulk volume and weight by the capacity of a rocket used for lift-off. For this reason it is necessary to make the payload structure as small and as light as possible. A representative form of space structures of medium to large size is that of truss construction. Truss structures are advantageously light but are disadvantageously restricted by their bulk volume in many cases.

In view of this circumstance, expandible-collapsible structures are being observed with great interest as a promising form of space structure. The structures are highly advantageous in that, at the time of lift-off, the bulk volume occupied by the structure can be greatly reduced by being folded or collapsed. Then, upon reaching their space destination, the structures are unfolded or expanded to assume their final form.

Generally, a one-dimensional truss construction has a wide range of applications to space structures such as keel beams of space stations and large antenna booms.

A typical example of expandible-collapsible structures of this nature is a box truss of the Martin Marietta corporation. Concerning this truss, a description is set forth in the following publication.

Herbert, J. J. et al., "Technology Needs of Advanced Earth Observation Spacecraft", NASA CP-3698, Jan. 1984.

The box truss, similarly as in many other one-dimensional expandible-collapsible structures, is adapted to be collapsed by pivotally flexing each skeletal member at a geniculate or knee joint provided at a middle part of the skeletal member.

In the truss construction of this character, there is a weakness in the middle part of each member, which has the largest effect on the Euler buckling. For this reason the construction is disadvantageous because of inadequate rigidity of the structure. Lowering of the rigidity is prevented by using a strong locking mechanism at each joint. However this measure would increase weight.

Another problem arises from the need to expand the structure automatically or semiautomatically in outer space. For this purpose, high reliability of the pertinent mechanisms is required. While a small number of locking mechanisms is desirable, four locking mechanisms are necessary for each basic unit in the above described truss. This is not desirable.

Accordingly, in order to solve the above described problems, there has been proposed a truss construction which has a minimal number of locking mechanisms for the joint and moreover has large rigidity and light weight. This truss construction is disclosed in U.S. Pat. No. 4,771,585 issued Sep. 20, 1988.

However, even this truss structure is not fully satisfactory on the points of number of locking mechanisms, strength, and weight.

SUMMARY OF THE INVENTION

Accordingly, it is an object of the present invention to provide a collapsible structure in which the number of locking mechanisms is reduced to a minimum, and which moreover has high strength and low weight.

According to the present invention, there is provided a collapsible truss structure which comprises: four joint connectors of a first set; four horizontal skeletal bars of a first set connected successively at ends thereof by the joint connectors to form a first quadrilateral; four vertical skeletal bars connected at their first ends respectively to the four joint connectors and extending in parallel in a direction perpendicular to the plane of the first quadrilateral, one of the vertical skeletal bars being longer than the other three bars, which are of the same length; four joint connectors of a second set, three of the joint connectors being connected respectively to the second ends of the three vertical skeletal bars of the same length, the remaining one of the four joint connectors being connected to the longer vertical skeletal bar at a part thereof of said same length from the respective joint connectors thereof of the first set; four horizontal skeletal bars of a second set connected successively at ends thereof by said joint connectors of the second set to form a second quadrilateral; a slide hinge slidably fitted around the longer vertical bar at a part thereof extending longer than said same length; and a diagonal bar connected diagonally between the slide hinge and the joint connector of the first set connected to the vertical skeletal bar diagonally opposite the longer vertical bar.

According to the present invention, there is further provided a truss structure which comprises: four joint connectors of a first set; horizontal skeletal bars of a first set connected successively at ends thereof by the joint connectors to form a first quadrilateral lying in a plane; four vertical skeletal bars of equal length connected at first ends thereof respectively to the four joint connectors and extending in parallel in a direction perpendicular to the plane of the first quadrilateral; four joint connectors of a second set connected respectively to the second ends of the vertical skeletal bars; horizontal skeletal bars of a second set connected successively at ends thereof by the joint connectors of the second set to form a second quadrilateral lying in a second plane parallel to the plane mentioned above; a slide hinge slidably fitted around one of the vertical skeletal bars and disposed closely adjacent to the joint connector connected to the second end of the one vertical skeletal bar; two diagonal skeletal bars diagonally connected respectively between the slide hinge and the joint connectors of the first set that are connected to the ends of the two vertical bars adjacent to said one vertical skeletal bar; and four pairs of flexible bracings respectively connected between the diagonally opposite joint connectors in the first and second quadrilaterals and between the diagonally opposite joint connectors in planes of diagonally opposite pairs of vertical skeletal bars, the flexible bracings being in taut state when the structure is in normal expanded state in the form of a rectangular parallelepiped, thereby holding the structure in that form.

The collapsing or folding action and the expanding action of the truss structure of the present invention are as follows.

In the folding action of the truss structure of the first stated mode, the slide hinge is caused to slide along the extension part of the longer vertical bar away from the joint connector of the second set of that longer bar. Then, as the slide hinge is thus displaced, the diagonal bar gradually moves toward an upright attitude so as to approach the longer vertical bar. At the same time, the vertical bar connected to the joint connector at the end of the diagonal bar opposite the slide hinge approaches the longer vertical bar. In connection with the displacements, the horizontal bars of the first and second sets that are adjacently joined by way of joint connectors gradually rise to form respective peaks with their joints as vertices. Finally, the diagonal bar, all horizontal bars, and the short vertical bars come together as a bundle snugly against the long vertical bar. Thus, the entire structure is folded into a compact form of small bulk volume. The structure thus folded is expanded by movements which are the reverse of those described above.

The truss structure of the second stated mode is folded by first causing the slide hinge to slide along its vertical bar from the joint connector at one end thereof to the other end. The two horizontal bars of the first set connected to the joint connector of the two diagonal bars connected to the slide hinge thereupon begin to bend in a geniculate manner to form a peak. In connection with these movements, the other two horizontal bars of the first set and adjacent horizontal bars of the second set also bend geniculately at their intervening joints to form vertex peaks. As the bending displacement proceeds further, the diagonal bars, the vertical bars, and the horizontal bars all come together until they are finally folded into a compact state. The lengths of the flexible bracing material are then slack. The structure thus folded is expanded by a reversal of the sequential movements described above. Finally, all of the lengths of flexible bracing material are stretched taut. Thus the rectangular shape of the expanded structure is preserved.

Preferred embodiments of the present invention will become understood from the following detailed description referring to the accompanying drawings.

DETAILED DESCRIPTION OF PREFERRED EMBODIMENTS

Figure 1:
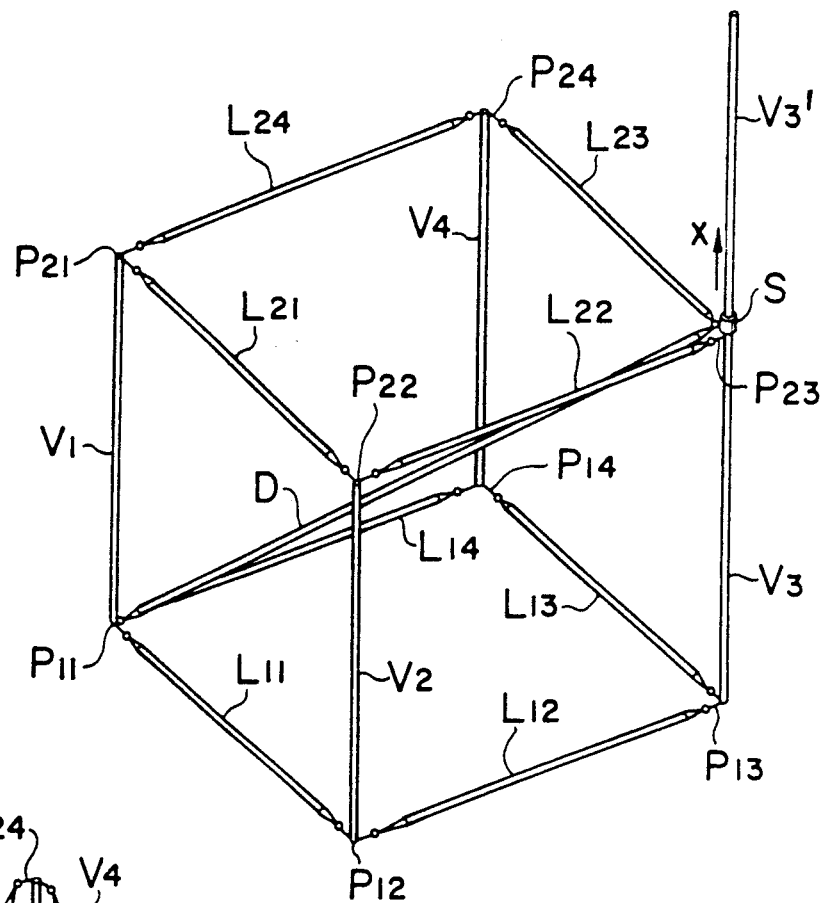
FIG. 1 is a perspective view showing an expanded state of a first embodiment of the truss structure according to the invention.
Figure 2:
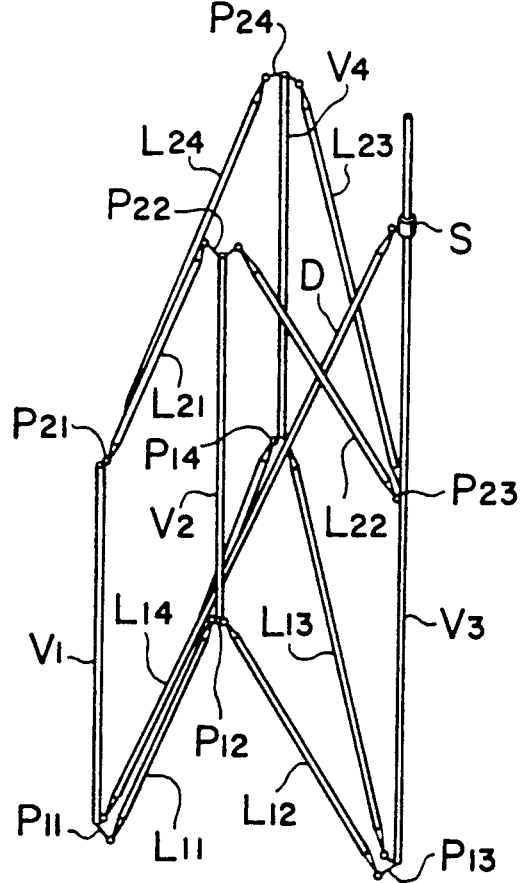
FIG. 2 is a perspective view of the same structure in an intermediate stage of its collapsing or folding process.

A first embodiment of the present invention is illustrated in FIGS. 1 and 2. A truss structure according to the embodiment is shown in expanded state in FIG. 1. The structure shown has a first set of four horizontal skeletal bars $L_{11}$, $L_{12}$, $L_{13}$, and $L_{14}$. The bars are connected at their ends successively by joint connectors $P_{12}$, $P_{13}$, $P_{14}$, and $P_{11}$. Each joint connector (hereinafter referred to as joint) connects the ends of two bars in a manner permitting free rotation of the bars around that joint. In the expanded state of the structure as shown in FIG. 1, the horizontal bars $L_{11}$ through $L_{14}$ form a rectangular quadrilateral lying in a common horizontal plane. The quadrilateral in the illustrated embodiment is a square, but it may be an oblong rectangle. Furthermore, the quadrilateral may be a non-rectangular quadrilateral.

The lower ends of four vertical skeletal bars $V_1$, $V_2$, $V_3$, and $V_4$ are connected respectively to the joints $P_{11}$ through $P_{14}$. The bars $V_1$ through $V_4$ are orientated perpendicularly to the horizontal plane of the first set of skeletal bars. One bar $V_3$ of the four vertical bars is made longer than the other three bars. The vertical bar $V_3$ thus has an upward extension $V_3'$. The remaining three vertical bars $V_1$, $V_2$, and $V_3$ have the same length.

The other or upper ends of the three vertical bars $V_1$, $V_2$, and $V_4$ are connected to joints $P_{21}$, $P_{22}$, and $P_{24}$. The long vertical bar $V_3$ is provided with a joint $P_{23}$ at its part of the same length as the other three vertical bars. The joint $P_{23}$ is disposed below but not connected to a slide hinge S slidably fitted around the vertical bar $V_3$. The four joints $P_{21}$, $P_{22}$, $P_{24}$, and $P_{23}$ rotatably join the ends of horizontal skeletal bars $L_{24}$, $L_{21}$, $L_{22}$, and $L_{23}$ of a second set. These horizontal bars of the second set also form the same quadrilateral as the horizontal bars of the first set with the structure in the expanded state shown in FIG. 1.

The slide hinge S is positioned immediately above the joint $P_{23}$ in the expanded state of FIG. 1. The slide hinge S is of a tubular shape and is capable of sliding along the extension $V_3'$ of the vertical bar $V_3$. The vertical bar $V_3$ is passed slidably through the hollow interior of the slide hinge S.

The slide hinge S is locked by a locking mechanism (not shown) at the time when the slide hinge S reaches a predetermined position in the expanded state. The hinge S is provided on its outer side with a hinge bracket for rotatable connection with the end of another skeletal bar.

One end of a diagonal skeletal bar D is pivotally connected to the slide hinge S. The other end of the diagonal bar D is connected to the lower joint $P_{11}$. Thus, the diagonal bar D is a three-dimensionally diagonal member extending from the slide hinge S to the most remote joint $P_{11}$ when the truss structure is in the deployed or expanded state.

When the truss structure described above is in the expanded state as shown in FIG. 1, all of the bars, with exception of the extension part $V_3'$, form a rectangular parallelepiped. The truss structure is collapsed or folded from the expanded state of FIG. 1 in the following manner.

The slide hinge S- slides along the extension $V_3'$ of the long vertical bar $V_3$ in the arrow direction X away from the joint $P_{23}$. As the slide hinge S is displaced, the upper end of the diagonal bar D pulled upward. The diagonal bar D thereby gradually assumes an upright orientation, approaching the long vertical bar $V_3$ as indicated in FIG. 2. Consequently, the vertical bar $V_1$ connected to the joint $P_{11}$ at the end of the diagonal bar D opposite the slide hinge S approaches the long vertical bar $V_3$. In concert with these movements, the horizontal bars $L_{11}$ and $L_{12}$, $L_{13}$ and $L_{14}$, $L_{21}$ and $L_{22}$, and $L_{23}$ and $L_{24}$ of the first and second sets gradually rise to form respective peaks with their joints as vertices. Finally, the diagonal bar D, all the horizontal bars and the short vertical bars $V_1$, $V_2$, and $V_3$ come together as a bundle snugly against the long vertical bar $V_3$. Thus, the entire structure is folded into a compact form of small bulk volume. The truss structure is expanded by movements which are the reverse of those described above.

Figure 3:
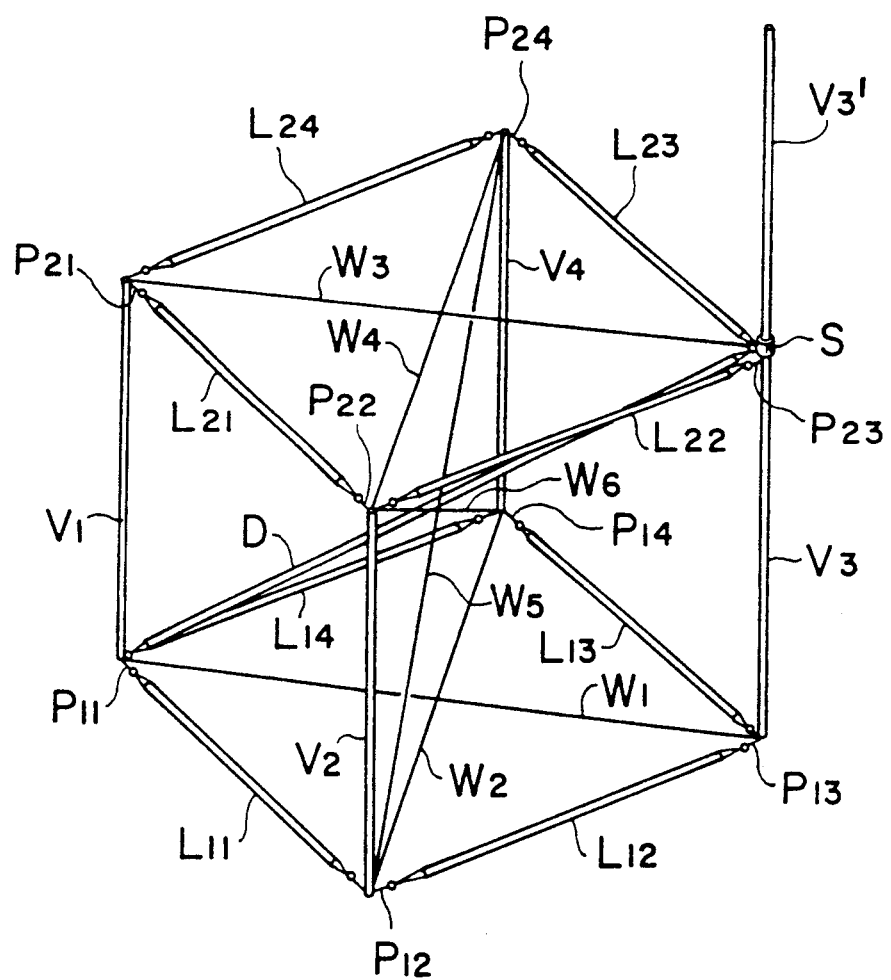
FIG. 3 is a perspective view showing an expanded state of a second embodiment of the truss structure of the present invention.

A second embodiment of the present invention is illustrated in FIG. 3. The skeletal bars and their connections are exactly the same as those of the first embodiment. Therefore, these bars are designated by the same reference characters, and description of the parts will not be repeated. The truss structure of the second embodiment differs from that of the first embodiment in the following features.

Within the plane of the first set of horizontal bars $L_{11}$ through $L_{14}$, diagonally opposed two joints are joined diagonally by flexible bracings or stays $W_1$ and $W_2$. Similarly, diagonally opposed two joints of the horizontal bars $L_{21}$ through $L_{24}$ are diagonally braced by flexible bracings $W_3$ and $W_4$. In addition, two flexible bracings $W_5$ and $W_6$ are diagonally strung respectively between the joints $P_{12}$ and $P_{24}$ and between the joints $P_{14}$ and $P_{22}$ within the plane defined by the vertical bars $V_2$ and $V_4$ and the bracings $W_2$ and $W_4$. The flexible bracing is, for example, a metal cable. When the truss structure is in the expanded state as shown in FIG. 3, all of the flexible bracings are under tension and therefore are taut.

A structure comprising only skeletal bars and joints, as in the first embodiment, is an unstable truss structure. Accordingly, any three points in any plane are fixed by means of flexible bracings as in the second embodiment. The structure thereby becomes stable.

The structure of the second embodiment is also folded from its expanded state shown in FIG. 3 into a compact state through the state shown in FIG. 2. In the folding process of the structure, all of the flexible bracings become limp.

A truss structure as described above with reference to FIG. 1 is per se an unstable truss structure. Therefore, when the structure is to be actually used, it is assembled in combination with another stable truss structure. By this combination, the joints of the truss structures shown in FIGS. 1 and 3 are fixed. More specifically, the three joints $P_{11}$, $P_{12}$, and $P_{14}$ of the first set and three joints $P_{21}$, $P_{22}$, and $P_{24}$ of the second set are fixed. As a result, the structures of FIGS. 1 and 3 become stable as a basic unit. Therefore, by combination with another stable truss structure, a structure such as a collapsible platform can be erected.

One example of such another stable truss will now be described with reference to FIGS. 3, 4, and 5. The stable truss is analogous, for example, to the truss structure disclosed in U.S. Pat. No. 4,771,585.

Figure 4:
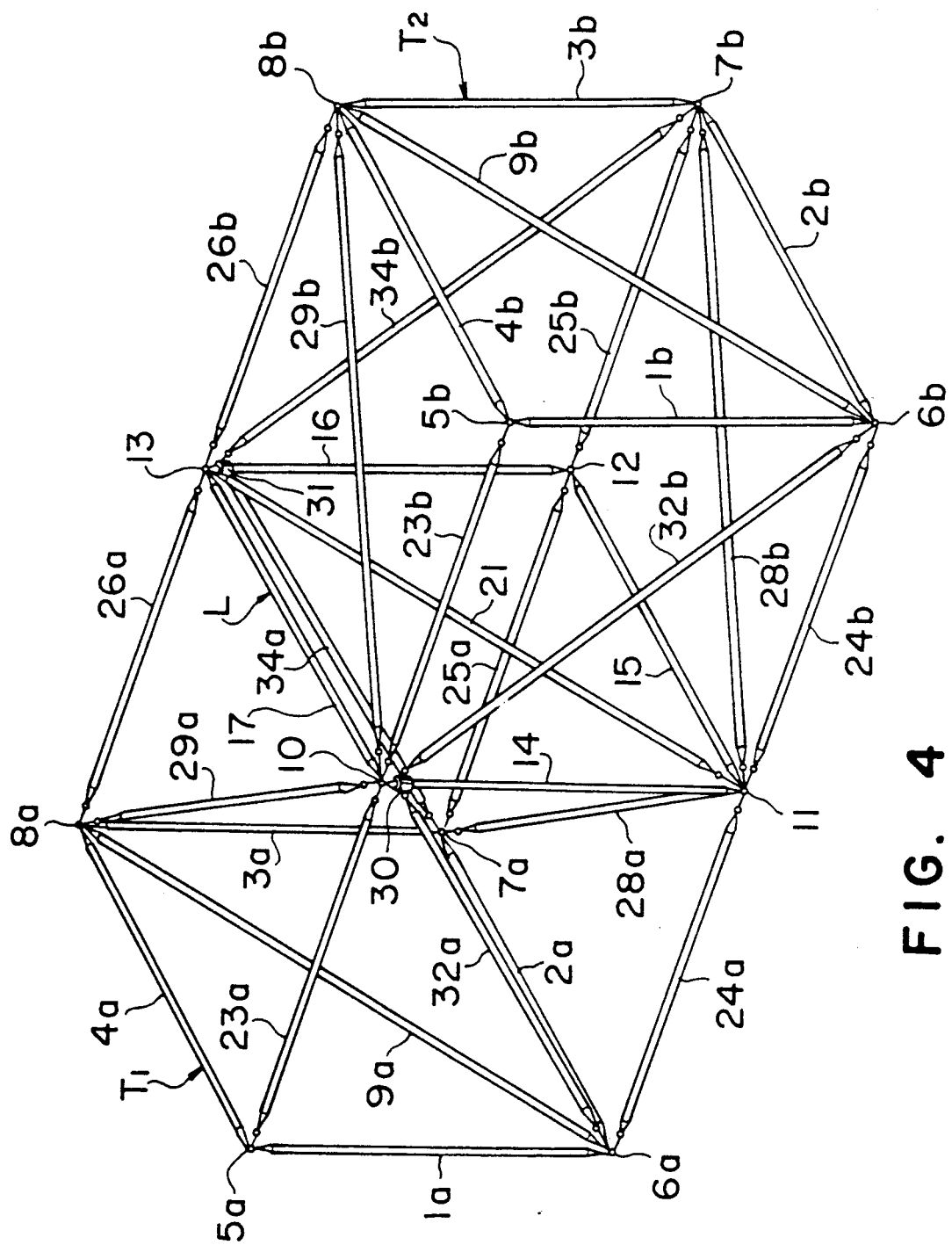
FIG. 4 is a perspective view showing an expanded state of a stable structure to be connected with the truss structures shown in FIGS. 1 and 3.

Referring to FIG. 4, the structure shown therein has a first qudrilateral truss $T_1$ on the left side as viewed. The first truss $T_1$ comprises four truss skeletal bars 1a, 2a, 3a, and 4a and first, second, third, and fourth joint connectors or joints 5a, 6a, 7a, and 8a connecting the truss bars 1a through 4a. The second joint 6a and the fourth joint 8a of the truss $T_1$ are connected by a diagonal bar 9a. Thus, the quadrilateral shape of the truss $T_1$ is maintained.

A second quadrilateral truss $T_2$ is provided on the right side of the structure, that is, on the side opposite that of the first quadrilateral truss $T_1$. The second truss $T_2$ similarly comprises four truss bars 1b, 2b, 3b, and 4b and fifth, sixth, seventh, and eighth joints 5b, 6b, 7b, and 8b connecting the truss bars 1b through 4b. The sixth joint 6b and the eighth joint 8b are connected by a diagonal bar 9b.

The first and second quadrilateral trusses $T_1$ and $T_2$ are so disposed that the joints 5a through 8a and 5b through 8b are respectively in confrontal opposition in spaced-apart relationship. An intermediate linkage L of quadrilateral shape is provided at an intermediate position between the two trusses $T_1$ and $T_2$. The intermediate linkage L comprises four link bars 14, 15, 16, and 17 and tenth, eleventh, twelfth, and ninth joints 11, 12, 13, and 10 respectively connecting pairs of the link bars 14 through 17. The qudrilateral shape of the intermediate linkage L is maintained by a diagonal bar 21 connected at its ends to the tenth joint 11 and the twelfth joint 13.

The first and second quadrilateral trusses $T_1$ and $T_2$ and the intermediate linkage L interposed therebetween are joined by connective bars. More specifically, the first joint 5a and the ninth joint 10, the second joint 6a and the tenth joint 11, the third joint 7a and the eleventh joint 12, and the fourth joint 8a and the twelfth joint 13 are respectively joined by connective bars 23a, 24a, 25a, and 26a. Thus, the first truss $T_1$ is connected to the intermediate linkage L. Similarly, the fifth joint 5b and the ninth joint 10, the sixth joint 6b and the tenth joint 11, the seventh joint 7b and the eleventh joint 12, and the eighth joint 8b and the twelfth joint 13 are respectively joined by connective bars 23b, 24b, 25b, and 26b. Thus the second truss $T_2$ is connected to the intermediate linkage L.

In addition, the first and second trusses $T_1$ and $T_2$ and the intermediate linkage L are connected also by diagonal bars. More specifically, the third joint 7a and the tenth joint 11 are joined by a diagonal bar 28a. The fourth joint 8a and the ninth joint 10 are joined by a diagonal bar 29a. Furthermore, the seventh joint 7b and the tenth joint 11 are joined by a diagonal bar 28b. The eighth joint 8b and the ninth joint 10 are joined by a diagonal bar 29b.

A first movable hinge block 30 is slidably fitted around the link bar 14 of the intermediate linkage L. The hinge block 30 is capable of sliding along the link bar 14. Similarly, a second movable hinge block 31 is slidably fitted around the link bar 16 on the opposite side of the intermediate linkage L from the link bar 14.

When the structure is in the expanded state as indicated in FIG. 4, the first movable hinge block 30 is adjacent to or in contact with the ninth joint 10. The hinge block 30 is joined to the second joint 6a and the sixth joint 6b respectively by diagonal link bars 32a and 32b. With the structure in the expanded state, the second movable hinge block 31 is similarly adjacent to or in contact with the twelfth joint 13. Also similarly, the hinge block 31 is joined to the third joint 7a and the seventh joint 7b respectively by diagonal link bars 34a and 34b.

The structure constituted by bars and joints as described above is in the form of a rectangular parallelepiped as a whole. The two sides of the structure are divided by the intermediate linkage L interposed therebetween and are mutually symmetrical.

One example of the movable hinge blocks 30 and 31 is described in U.S. Pat. No. 4,771,585 mentioned before. It is thus known and therefore will not be described herein.

The structure in the expanded state as shown in FIG. 4 is collapsed or folded in the following manner. By means of a motor (not shown), the movable hinge blocks 30 and 31 are slidingly moved respectively along the link bars 14 and 16 toward the joints 11 and 12. Accordingly, the structure begins to collapse toward the state indicated in FIG. 5. More specifically, the first and second quadrilateral trusses $T_1$ and $T_2$ approach each other while maintaining their mutually parallel state and their planar quadrilateral shape. The connective bars 23a and 23b, 24a and 24b, 25a and 25b, and 26a and 26b undergo pivotal flexing respectively with joints 10, 11, 12, and 13 as geniculate or knee joints. In accordance with this, the quadrilateral intermediate linkage L is displaced upward as viewed in FIG. 5 while preserving the quadrilateral shape and parallel relationship to the first and second trusses $T_1$ and $T_2$. The folding action progresses further until the final folded state of the structure indicated in FIG. 6 is attained. In this state, the entire structure takes a compact form of a plate or slab.

The transitional action of the structure from the folded state to the expanded state takes place in a sequence which is reverse to that described above.

Figure 5:
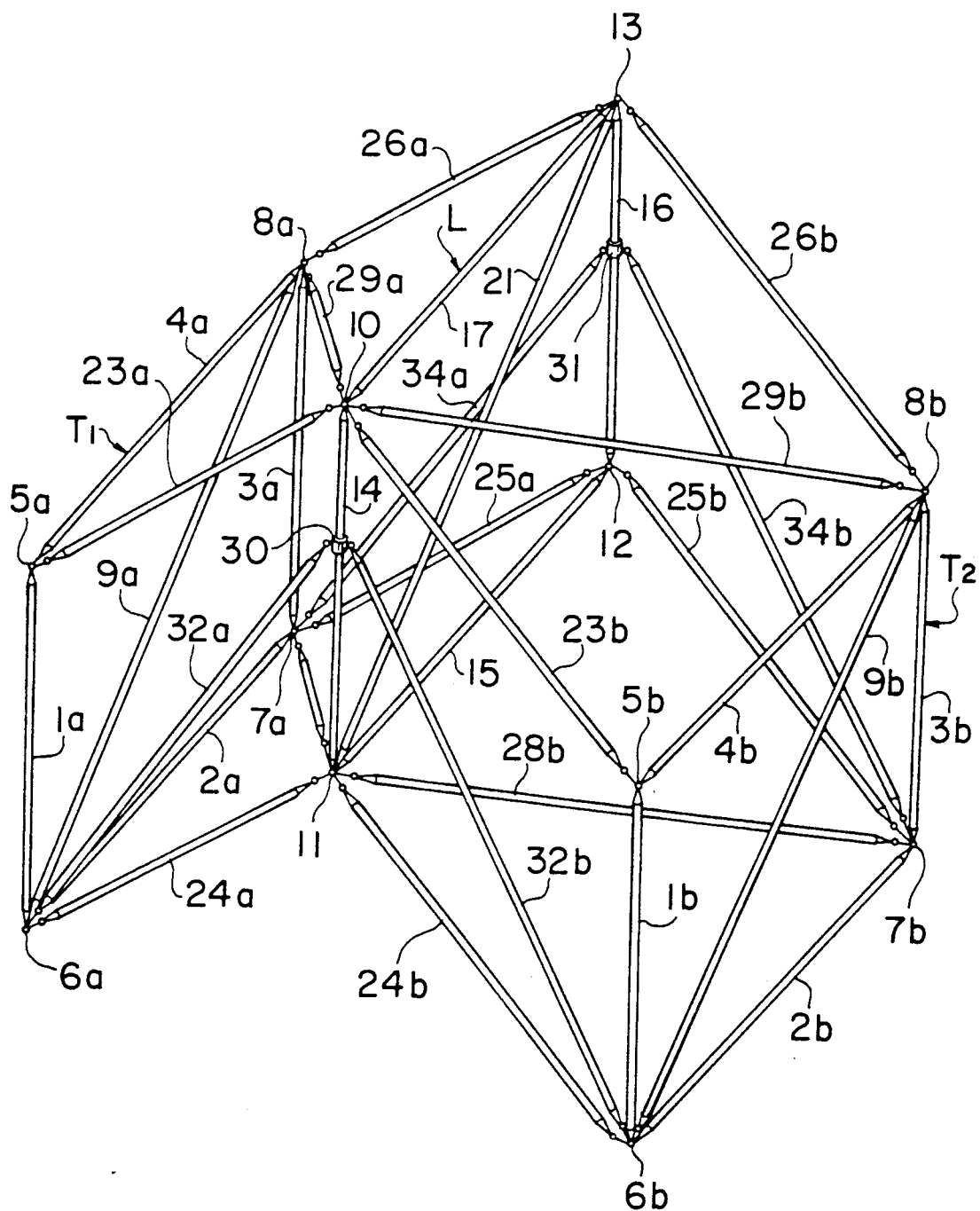
FIG. 5 is a perspective view showing the structure shown in FIG. 4 in an intermediate stage of its folding process.
Figure 6:
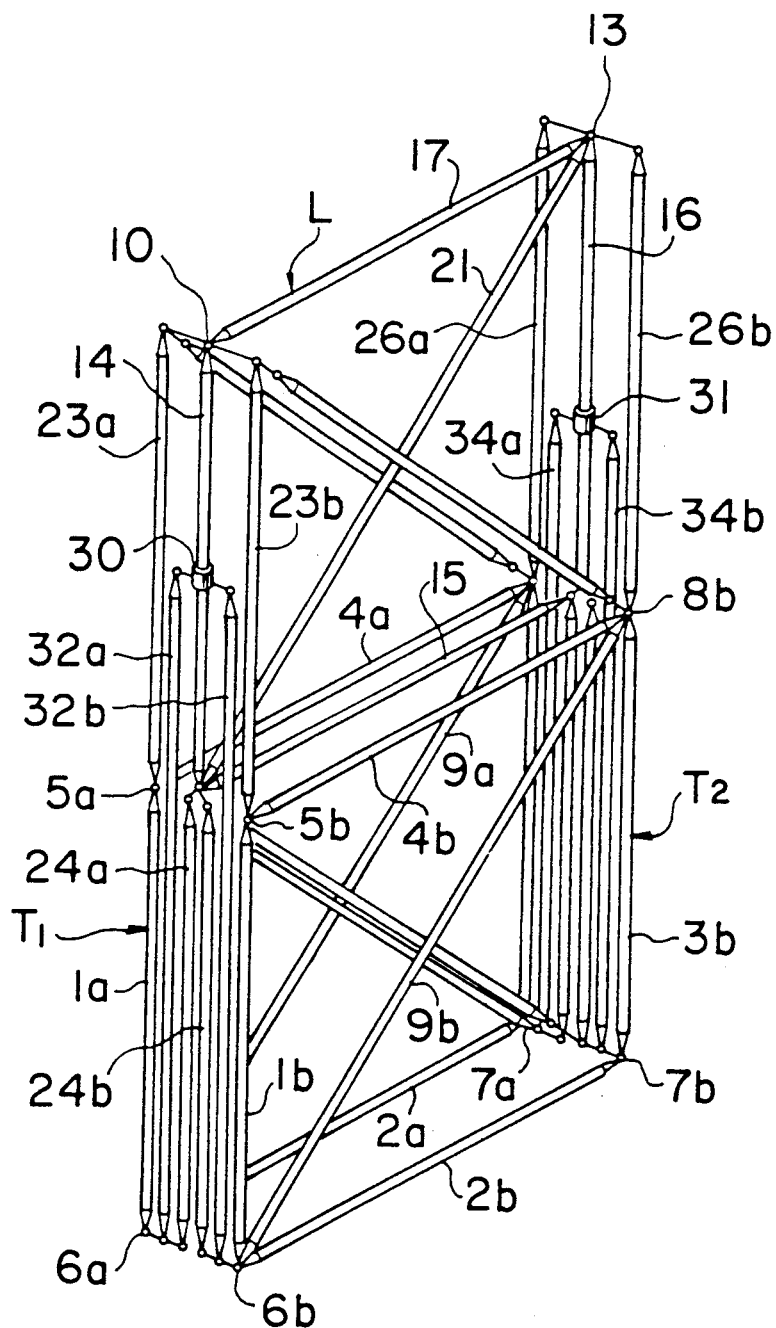
FIG. 6 is a perspective view showing the same structure in folded state.
Figure 7:
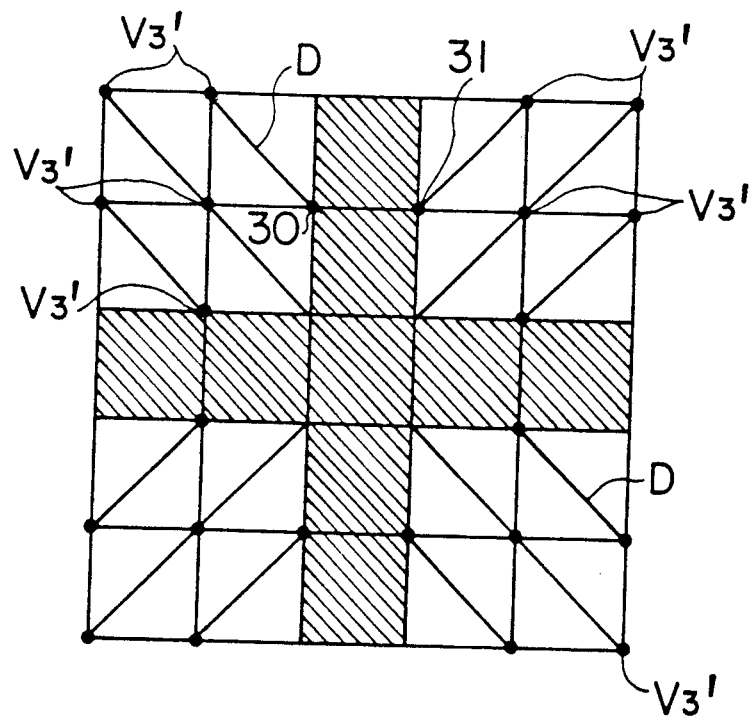
FIGS. 7 and 8 are schematic diagrams respectively showing examples of connection of the structures of the first and second embodiments of the present invention with the structure shown in FIG. 4.

One example wherein the truss structures as shown in FIG. 1 are assembled in combination with stable truss structures as shown in FIGS. 4, 5, and 6 is indicated schematically in FIG. 7. In this figure, the cross-hatched portion is a portion wherein stable truss structures as shown in FIG. 4 are in joined-together state. The portions without cross-hatching are portions wherein truss structure units of FIG. 1 have been joined together. One quadrilateral figure corresponds to one unit of the truss structure. The diagonal line D in each quadrilateral figure indicates a diagonal bar. The black dots at the ends of the diagonal bars D (in the portions without cross hatching) correspond to long vertical bars $V_3'$. The joining together of adjacent truss structure units is accomplished by commonly using vertical bars at the same positions. By such structural arrangement, a comprehensively two-dimensional expandible platform is assembled. Thus, an unstable truss structure becomes stable. A structure which is stable as a whole is thereby obtained.

Figure 8:
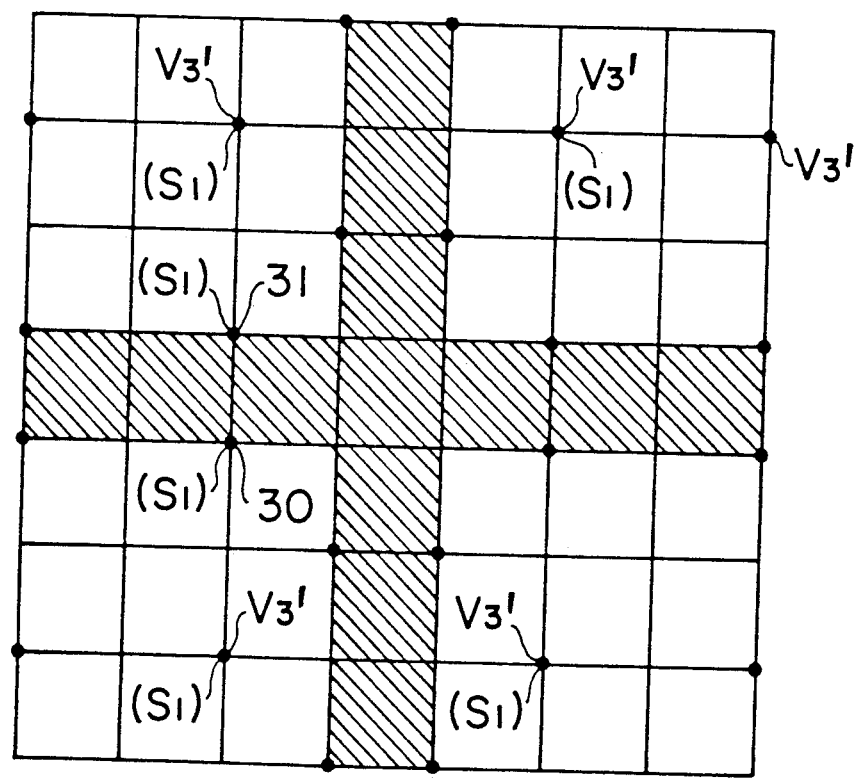

One example of combined assembling of truss structures as shown in FIG. 3 with stable truss structures as shown in FIG. 4 is indicated schematically in FIG. 8. In FIG. 8 also, the cross-hatched portions are those wherein stable truss structures of FIG. 4 have been joined together The portions without cross hatching are those wherein units of the truss structure of FIG. 3 have been joined together. The black dots in the portions without cross hatching indicate the positions of the long vertical bars $V_3$ similarly as in FIG. 7. The diagonal bars are not shown in FIG. 8.

A third embodiment of the truss structure of the present invention will now be described with reference to FIGS. 9 and 10. In the structure, horizontal skeletal bars $L_{11}$, $L_{12}$, $L_{13}$, and $L_{14}$ of a first set are respectively connected by joints $P_{12}$, $P_{13}$, $P_{14}$, and $P_{11}$. Each joint is so adapted that the horizontal bars connected thereby can rotate freely therearound. The horizontal bars $L_{11}$ through $L_{14}$ are so arranged that, when the structure is in the expanded state shown in FIG. 9, the bars form a quadrilateral figure. In this case also, the quadrilateral figure need not be a square or a rectangle.

The ends on one side of vertical skeletal bars $V_1$, $V_2$, $V_3$, and $V_4$ of equal length are connected respectively to the joints $P_{11}$ through $P_{14}$. The vertical skeletal bars are perpendicular to the plane defined by the horizontal bars of the first set when the structure is in the expanded state. The other ends of the vertical bars $V_1$ through $V_4$ are provided respectively with joints $P_{21}$, $P_{22}$, $P_{23}$, and $P_{24}$. Four horizontal bars $L_{24}$, $L_{21}$, $L_{22}$ and $L_{23}$ of a second set are connected to the four joints $P_{21}$, $P_{22}$, $P_{23}$ and $P_{24}$. The horizontal bars of the second set form a qudrilateral figure, similarly as the horizontal bars of the first set, when the structure is in its state shown in FIG. 9.

A slide hinge $S_1$ is fitted slidably around one vertical bar ($V_2$ in this embodiment) at its end part close to the joint $P_{22}$ when the structure is in the expanded state. The slide hinge $S_1$ is capable of sliding along the vertical bar $V_2$. The slide hinge S is locked by a locking mechanism (not shown) in the expanded state. One end of each of two diagonal bars $D_1$ and $D_2$ is pivotally connected to the slide hinge $S_1$. The other ends of these diagonal bars $D_1$ and $D_2$ are respectively connected to the joints $P_{11}$ and $P_{13}$ of the first set.

Similarly as in the structure illustrated in FIG. 3, flexible bracings $W_1$ through $W_6$ are stretched diagonally between joints In addition, flexible bracings $W_7$ and $W_8$ are diagonally stretched respectively between the joints $P_{13}$ and $P_{21}$ and between the joints $P_{11}$ and $P_{23}$.

Figure 9:
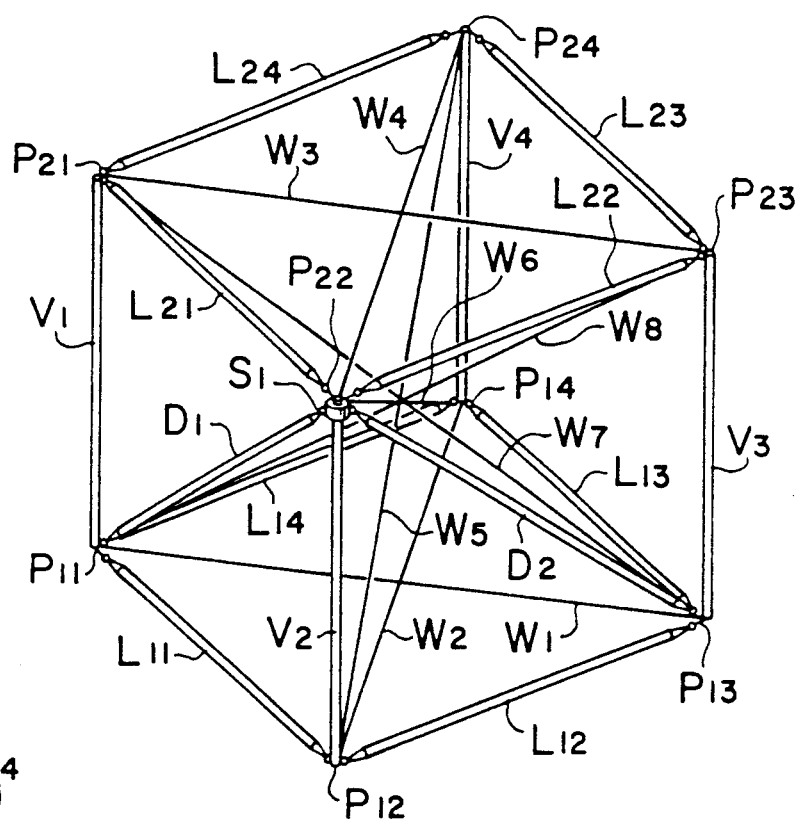
FIG. 9 is a perspective view showing an expanded state of a third embodiment of the truss structure of the present invention.
Figure 10:
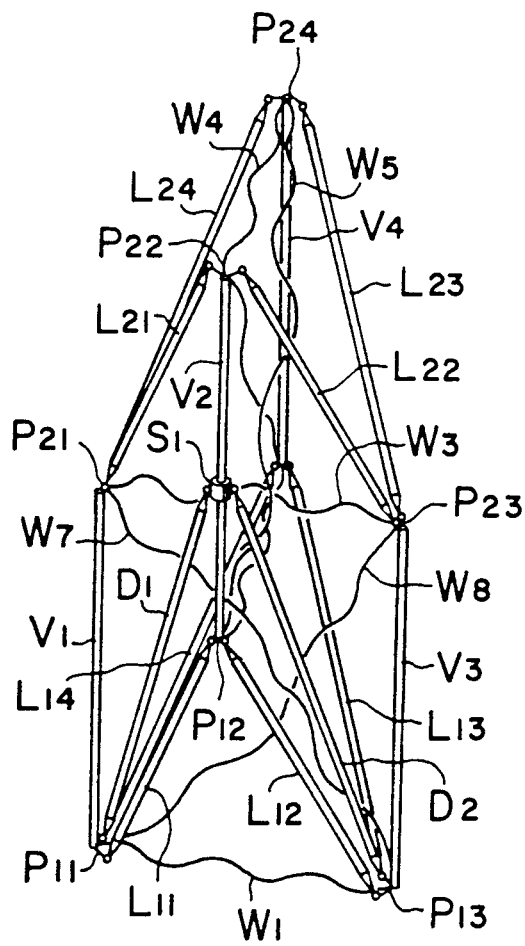
FIG. 10 is a perspective view showing the structure of FIG. 9 in an intermediate stage of its folding process.

The structure shown in the expanded state in FIG. 9 is collapsed or folded in the following manner. The slide hinge $S_1$ slides along the vertical bar $V_2$ in the direction from the joint $P_{22}$ toward the joint $P_{12}$. As a consequence, the two horizontal bars $L_{11}$ and $L_{12}$ of the first set bend or fold at the joint $P_{12}$ as a geniculate joint as indicated in FIG. 10. The two bars $L_{11}$ and $L_{12}$ thus form a peak with the joint $P_{12}$. In concert with these movements, the other two horizontal bars $L_{13}$ and $L_{14}$ of the first set and the adjacent horizontal bars $L_{21}$ and $L_{22}$ and bars $L_{23}$ and $L_{24}$ of the second set are folded geniculately to form vertex peaks at the joints $P_{14}$, $P_{22}$ and $P_{24}$. As this bending displacement proceeds further, the diagonal bars, the vertical bars, and horizontal bars all come together until they are finally folded into a compact state. The flexible bracings are then slack.

The structure thus folded is expanded by a reversal of the sequential movements described above. Finally, all of the flexible bracings $W_1$ through $W_8$ are stretched taut, thereby preserving the rectangular shape of the expanded structure.

The collapsible structure of the third embodiment, also, is an unstable truss structure by itself. However, the structure can be stabilized by fixing any three joints in any plane thereof. Also in the case of the third embodiment, the structure can be used in connected state with a stable truss structure (cross hatched portion) as indicated in FIG. 8. In this connection, the slide hinge S₁ in the case of the third embodiment is indicated in parentheses in FIG. 8.

The representative characteristics of a collapsible truss are its folding or compaction efficiency and the number of mechanisms, i.e. the number of locking mechanism or sliding mechanisms (slide hinges) required for the expansion. The compaction efficiency is expressed as $$\frac{\text{Volume when expanded}}{\text{Volume when folded}} \times \left(\frac{d}{l}\right)^2,$$

where:
d is the diameter of the members constituting the truss structures, and
l is the length thereof.

The number of mechanisms required for expansion is expressed as an equivalent number necessary for one basic unit when an infinitely extensive two-dimensional platform is built.

Therefore, in the case where a single slide hinge commonly serves four mutually adjacent basic units, as in the second embodiment (FIGS. 3 and 8), the number of necessary mechanisms becomes equivalently one fourth, i.e., 0.25.

A comparison between the characteristics of the embodiments of the present invention and examples of conventional representative truss structure is as follows.

| Charac-<br>teristic | The present invention | | | Conventional examples | | |
|---|---|---|---|---|---|---|
| | 1st | 2nd | 3rd | A | B | C |
| Compaction efficiency | 0.056–0.125 | 0.056–0.125 | 0.043 | 0.110 | 0.029 | 0.044 |
| Number of mechanisms required for expansion | 1 | 0.25 | 0.25 | 4 | 4 | 1 |

It is apparent from the above table that, in comparison with conventional collapsible trusses, the structures of the present invention afford the same or higher compaction efficiencies with fewer mechanisms. Particularly, in the case of the second and third embodiments of the present invention, the number of required mechanisms is 0.25 in each case. In order to fold a truss, at least one mechanism is necessary. Also, there is no possibility of a single mechanism being used commonly for five or more mechanisms. From the above two reasons, the number of required mechanisms can never be reduced to 0.25 or less. It therefore follows that the second and third embodiments afford a compaction efficiency equivalent to or higher than those of conventional trusses with the theoretically minimum mechanism.

For high reliability of the expanding action, a small number of mechanisms is required The present invention meets this requirement at a higher level than conventional trusses. Another feature of the structure of the present invention is that, during the folding process, even a single member is not geniculately bent. Therefore, the rigidity of the truss at the time of expansion is advantageously very high.

As described above, an important feature of the truss structure of the present invention is that its constructional organization does not require the use of frame members which are geniculately bent or elongated and contracted. Therefore, the structure has high rigidity. Furthermore, the structure has excellent compaction efficiency and comprises a very small number of mechanisms required for expansion.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A collapsible truss structure comprising:
   four joint connectors of a first set;
   four horizontal skeletal bars of a first set connected successively at ends thereof by said joint connectors to form a first quadrilateral lying in a plane;
   four vertical skeletal bars connected at first ends thereof respectively to said four joint connectors and extending in parallel in a direction perpendicular to the plane of said first quadrilateral, one of said vertical skeletal bars being longer than the other three bars, which are of the same length;
   four joint connectors of a second set, three of said joint connectors being connected respectively to the second ends of said three vertical skeletal bars of the same length, the remaining one of said joint connectors being connected to said longer vertical skeletal bar at a part thereof of said same length from the respective joint connectors thereof of said first set;
   four horizontal skeletal bars of a second set connected successively at ends thereof by said joint connectors of said second set to form a second quadrilateral;
   a slide hinge slidably fitted around said longer vertical skeletal bar at the part thereof extending longer than said same length; and
   a diagonal skeletal bar connected diagonally between said slide hinge and the joint connector of the first set connected to the vertical skeletal bar diagonally opposite said longer vertical skeletal bar.

2. The collapsible truss structure according to claim 1, further comprising:
   first flexible bracings respectively connecting in taut state two pairs of diagonally opposite joint connectors of said first set, within said first quadrilateral;
   second flexible bracings material respectively connecting in taut state two pairs of diagonally opposite joint connectors of said second set, within said second quadrilateral; and
   third flexible bracings respectively connecting in taut state two pairs of diagonally opposite joint connectors connected to the ends of said two vertical bars, within the plane passing through the two vertical skeletal bars closest to said longer vertical skeletal bar.

3. The collapsible truss structure according to claim 2, wherein said flexible bracings are metal wires.

4. A collapsible truss structure comprising:
   four joint connectors of a first set;
   horizontal skeletal bars of a first set connected successively at ends thereof by said joint connectors to form a first quadrilateral lying in a plane;
   four vertical skeletal bars of equal length connected at first ends thereof respectively to said four joint connectors and extending in parallel in a direction perpendicular to the plane of said quadrilateral;

four joint connectors of a second set connected respectively to the second ends of said vertical skeletal bars;

horizontal skeletal bars of a second set connected successively at ends thereof by said joint connectors of said second set to form a second quadrilateral lying in a second plane parallel to said first plane;

a slide hinge slidably fitted around one of said vertical skeletal bars and disposed closely adjacent to the joint connector connected to the second end of said one vertical skeletal bar;

two diagonal skeletal bars diagonally connected respectively between said slide hinge and the joint connectors of said first set that are connected to the ends of the two vertical skeletal bars adjacent to said one vertical skeletal bar; and four pairs of flexible bracings respectively connected between the diagonally opposite joint connectors in said first and second quadrilaterals and between the diagonally opposite joint connectors in planes of diagonally opposite pairs of vertical skeletal bars, said flexible bracings being in taut state when said structure is in expanded state in the form of a rectangular parallelepiped, thereby holding said structure in said form.

5. The collapsible truss structure according to claim 4, wherein said flexible bracings are metal cables.

* * * * *